United States Patent
Li et al.

(10) Patent No.: US 11,558,859 B2
(45) Date of Patent: Jan. 17, 2023

(54) BETA OFFSET MANAGEMENT FOR URLLC UCI

(71) Applicant: Telefonaktiebolaget LM Ericsson (publ), Stockholm (SE)

(72) Inventors: Shaohua Li, Kanata (CA); Gustav Wikström, Täby (SE); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 8 days.

(21) Appl. No.: 16/961,997

(22) PCT Filed: Jan. 18, 2019

(86) PCT No.: PCT/EP2019/051237
§ 371 (c)(1),
(2) Date: Jul. 14, 2020

(87) PCT Pub. No.: WO2019/141805
PCT Pub. Date: Jul. 25, 2019

(65) Prior Publication Data
US 2020/0344752 A1 Oct. 29, 2020

Related U.S. Application Data

(60) Provisional application No. 62/619,485, filed on Jan. 19, 2018.

(51) Int. Cl.
*H04W 72/04* (2009.01)
*H04B 7/06* (2006.01)
(Continued)

(52) U.S. Cl.
CPC ...... *H04W 72/0413* (2013.01); *H04B 7/0626* (2013.01); *H04L 1/1819* (2013.01); *H04L 1/203* (2013.01); *H04W 72/10* (2013.01)

(58) Field of Classification Search
None
See application file for complete search history.

(56) References Cited

U.S. PATENT DOCUMENTS

| | | | |
|---|---|---|---|
| 2011/0310986 A1* | 12/2011 | Heo | H04W 72/0413 375/259 |
| 2017/0238263 A1* | 8/2017 | Lee | H04L 5/14 370/328 |
| 2020/0274637 A1* | 8/2020 | Li | H04W 72/042 |

(Continued)

OTHER PUBLICATIONS

Huawei, HiSilicon, "Discussion on UCI feedback for URLLC", Jan. 13, 2018, 3GPP TSG RAN WG1, pp. 1-13 (Year: 2018).*

(Continued)

*Primary Examiner* — Steve R Young
(74) *Attorney, Agent, or Firm* — Sage Patent Group

(57) ABSTRACT

A method and apparatus are disclosed for configuring at least one set of beta offset values, and for each of the at least one set of beta offset values, at least one subset of beta offset values being defined for information corresponding to Uplink Control Information, UCI, and being associated with at least one service type. A method and apparatus are disclosed for obtaining a configuration of at least one set of beta offset values, for each of the at least one set of beta offset values, the configuration being associated with at least one subset of beta offset values, the at least one subset of beta offset values being defined for information corresponding to UCI and being associated with at least one service type.

18 Claims, 7 Drawing Sheets

(51) Int. Cl.
*H04L 1/20* (2006.01)
*H04L 1/18* (2006.01)
*H04W 72/10* (2009.01)

(56) References Cited

U.S. PATENT DOCUMENTS

| | | | | |
|---|---|---|---|---|
| 2020/0288458 | A1* | 9/2020 | Takeda | H04L 5/0055 |
| 2020/0351867 | A1* | 11/2020 | Guo | H04W 76/27 |
| 2020/0374917 | A1* | 11/2020 | Takeda | H04L 5/0044 |

OTHER PUBLICATIONS

PCT International Search Report and Written Opinion dated May 16, 2019 for International Application No. PCT/EP2019/051237, 14 pages.

Huawei et al., "Discussion on UCI feedback for URLLC", 3GPP TSG RAN WG1 Ad Hoc Meeting, R1-1800054, Vancouver, Canada, Jan. 22-26, 2018, 13 pages.

Huawei et al., "On UCI multiplexing", 3GPP TSG RAN WG1 Meeting #91, R1-1719397, Reno, USA, Nov. 27-Dec. 1, 2017, 9 pages.

LG Electronics, "Discussion on UL control with ultra-reliability", 3GPP TSG RAN WG1 RAN1 90bis, R1-1717964, Prague, Czech Republic, Oct. 9-13, 2017, 5 pages.

Huawei et al., "On UCI multiplexing", 3GPP TSG RAN WG1 Meeting AH_NR#3, R1-1715404, Nagoya, Japan, Sep. 18-21, 2017, 7 pages.

Samsung, "On UCI Multiplexing in PUSCH", 3GPP TSG RAN WG1 #90bis, R1-1717654, Prague, Czech Republic, Oct. 9-13, 2017, 4 pages.

* cited by examiner

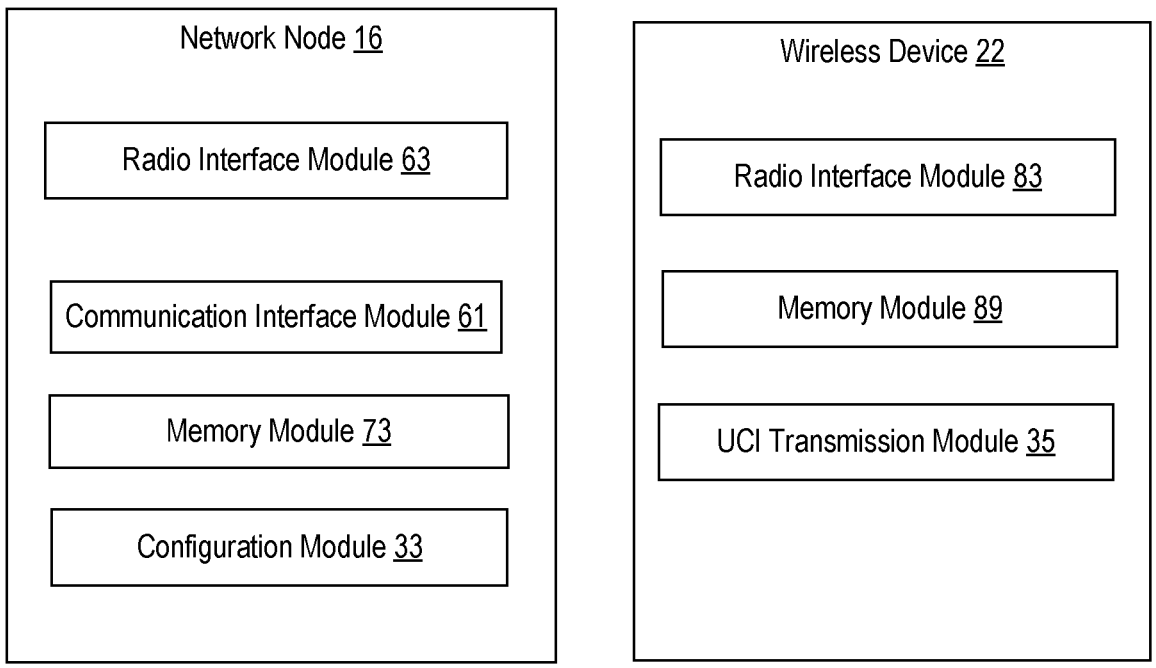
FIG. 4
FIG. 5
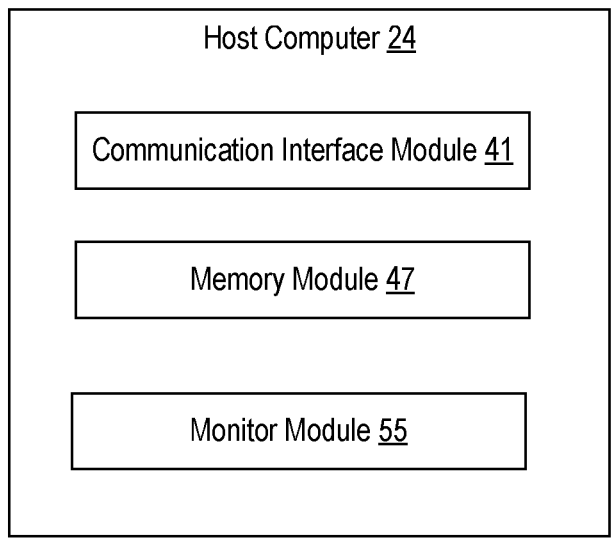
FIG. 3

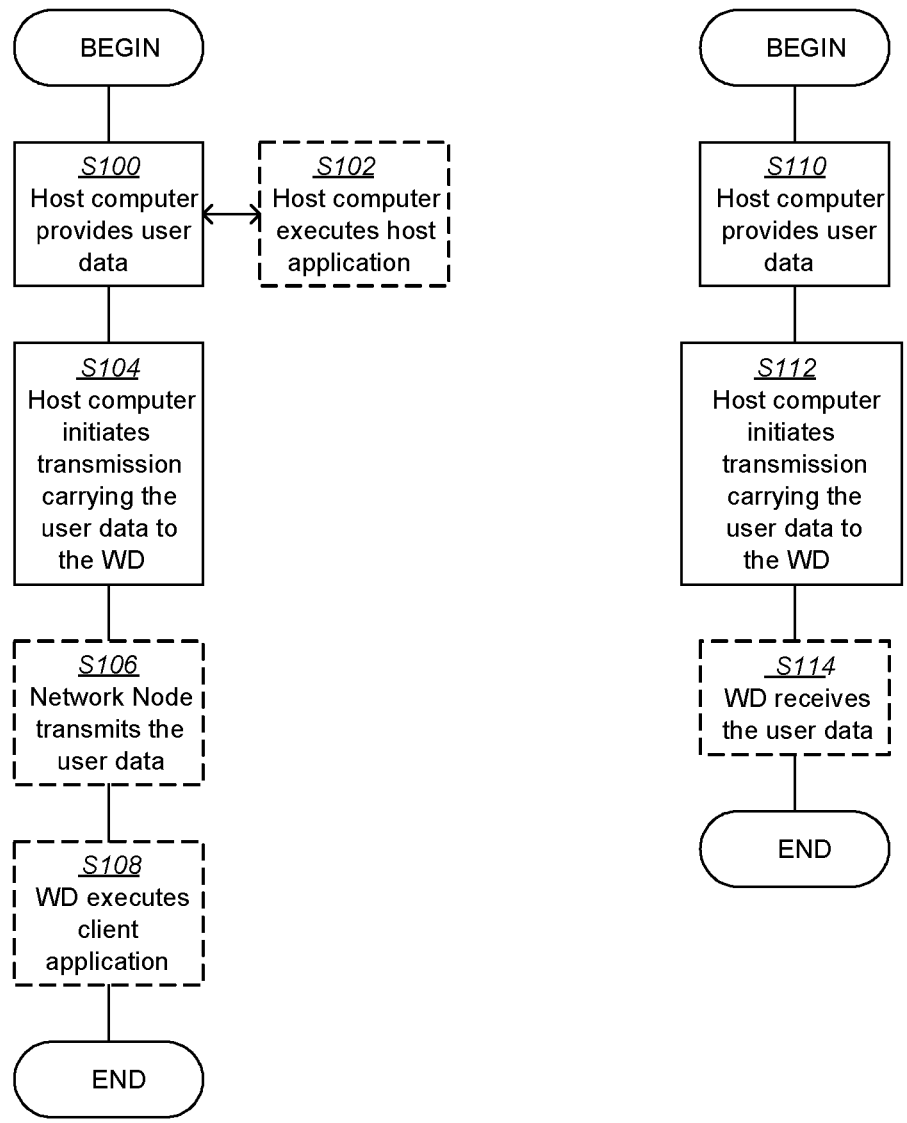

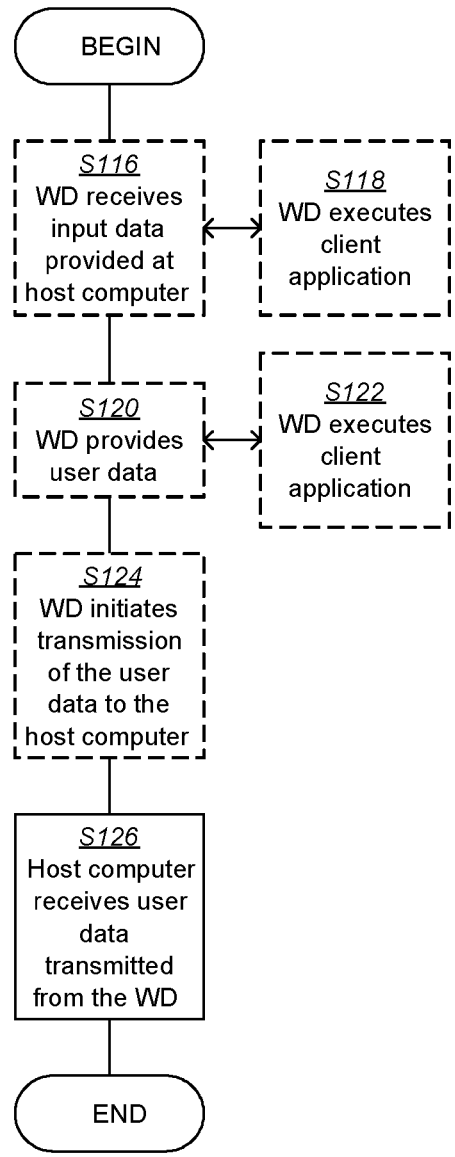
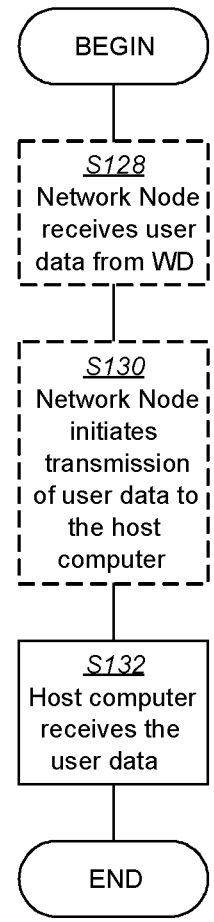
FIG. 8
FIG. 9

BETA OFFSET MANAGEMENT FOR URLLC UCI

CROSS-REFERENCE TO RELATED APPLICATIONS

This application is a 35 U.S.C § 371 national stage application for International Application No. PCT/EP2019/051237, entitled "BETA OFFSET MANAGEMENT FOR URLLC UCI", filed on Jan. 18, 2019, which claims priority to U.S. Provisional Patent Application No. 62/619,485, filed on Jan. 19, 2018, the disclosures and contents of which are hereby incorporated by reference in their entireties.

TECHNICAL FIELD

Wireless communication and in particular, to transmission for Ultra-Reliable Low Latency Communications (URLLC) Uplink Control Information (UCI).

BACKGROUND

URLLC traffic has been identified as one traffic group to be served in wireless networks, such as, for example, New Radio (NR). As compared to enhanced Mobile Broadband (eMBB) traffic, URLLC traffic may be considered to have the following characteristics:
- the data packet for URLLC traffic is much smaller;
- the data packet arrival is much sparser;
- much lower delay budget over the air interface;
- low Medium Access Control (MAC) delay requirement in the air interface and possibly Radio Link Control (RLC)/Packet Data Convergence Protocol (PDCP) Automatic Repeat reQuest (ARQ) not applicable; and
- the control and data channel reliability is much higher. For example, the Block Error Rate (BLER) target is about $10^{-5}$ and may in some cases be even more stringent, such as, for example, the BLER target may even be close to $10^{-6}$.

In 3rd Generation Partnership Project (3GPP), the following aspects may be considered:
- Packet duplication in the PDCP layer;
- Physical Downlink Control Channel (PDCCH) enhancement (such as, for example, increase in the PDCCH aggregation level, duplicate PDCCH transmission, etc.);
- Channel State Information (CSI) enhancement (such as, for example, use of more stringent BLER target for the CSI derivation); and
- Physical Downlink Shared Channel (PDSCH) enhancement (such as, for example, use of separate Transport Block Size (TBS) tables for URLLC and eMBB).

Other considerations include performing more reliable transmission of UCI based on different service types. However, how to implement more reliable transmission is quite challenging.

It may be considered that, for UCI on the Physical Uplink Shared Channel (PUSCH), support for both dynamic and semi-static beta offset, $\beta_{offset}$, indication is provided. For dynamically scheduled PUSCH transmission, a plurality of sets of beta offset values can be configured by Radio Resource Control (RRC) signaling, and the PDCCH can dynamically indicate an index to a set of beta offset values. Each set of beta offset values may include a plurality of entries, each of the plurality of entries corresponding to a respective UCI type (including two-part CSI when applicable). The beta offset, $\beta_{offset}$, may be considered to be used for computing the amount of Resource Elements (REs) for each respective UCI on the PUSCH. UCI may include, for example, HARQ-ACK and CSI.

If a wireless device (WD) (e.g., user equipment (UE)) is configured with dynamic beta offset, four (4) sets of beta offset values may be configured for each Hybrid-ARQ-ACK (HARQ-ACK) (also called the HARQ ACK/NACK, HARQ acknowledge message, HARQ feedback, etc.) payload range and CSI payload range and type, respectively via RRC signaling. Also, two (2) bits in the Downlink Control Information (DCI) may indicate one out of the four (4) sets of beta offset values. Each set of beta offset values may include beta offset values for HARQ-ACK ranges and beta offset values for CSI payload ranges and type. The beta offset values may be given by:
- Three (3) beta offset values are defined as one set, when HARQ-ACK piggyback on PUSCH. The three (3) values may correspond to the following cases:
  - The number of HARQ-ACK bits OACK≤2
  - The number of HARQ-ACK bits falls into [3]≤OACK≤[11]
  - The number of HARQ-ACK bits OACK>[11]
- Four (4) beta offset values are defined for CSI as one set, when CSI piggybacks on the PUSCH. The four (4) values may correspond to the following cases:
  - Regardless CSI type 1 or 2, the number of bits for CSI part 1 OCSI_part1≤[11]
  - Regardless CSI type 1 or 2, the number of bits for CSI part 1 OCSI_part1>[11]
  - Regardless CSI type 1 or 2, the number of bits for CSI part 2 OCSI_part2≤[11]
  - Regardless CSI type 1 or 2, the number of bits for CSI part 2 OCSI_part2>[11]

It has been agreed that CSI is always split into CSI part 1 and CSI part 2 when CSI piggybacks on the PUSCH (with CSI type 1, CSI part 2 does not exist when there is no Precoding Matrix Indicators (PMI) and with rank up to 4).

As one example, the beta offset values can be configured as in Table 1.

TABLE 1

Beta Offset Values Configuration in RRC Signaling

| Set k (k = 0, 1, 2, 3) | For ACK | $\beta_{ack}^{(k,0)}$ | When the number of HARQ-ACK bits OACK ≤ 2 |
|---|---|---|---|
| | | $\beta_{ack}^{(k,1)}$ | When the number of HARQ-ACK bits falls into [3] ≤ OACK ≤ [11] |
| | | $\beta_{ack}^{(k,2)}$ | When the number of HARQ-ACK bits OACK > [11] |
| | For CSI | $\beta_{CSI}^{(k,0)}$ | Regardless CSI type 1 or 2, when the number of bits for CSI part 1 OCSI_part1 ≤ [11] |
| | | $\beta_{CSI}^{(k,1)}$ | Regardless CSI type 1 or 2, when the number of bits for CSI part 1 OCSI_part1 > [11] |
| | | $\beta_{CSI}^{(k,2)}$ | Regardless CSI type 1 or 2, when the number of bits for CSI part 2 OCSI_part2 ≤ [11] |
| | | $\beta_{CSI}^{(k,3)}$ | Regardless CSI type 1 or 2, when the number of bits for CSI part 2 OCSI_part2 > [11] |

Two (2) bits in DCI will be used to inform which set is used for the final beta offset value
Beta offset value will be configured via RRC It has been agreed that a good performance can be achieved when only eMBB or only URLLC is supported. However, for one terminal that supports eMBB and URLLC simultaneously at a given interval, the performance may not be optimized with the current agreed mechanism. For example, when a beta offset value is decided on, the RRC can be used to configure the beta offset value with an assumption of an eMBB service. In this case, when URLLC service is transmitted, the same sets of beta offset values are applied to both eMBB and URLLC services and thus, the performance of UCI for the URLLC services may not meet the high reliability requirements since the configured beta offset values may be too small for the reliable transmission of UCI. On the other hand, if RRC is used to configure the beta offset values with an assumption of URLLC service, resources may be wasted when only eMBB UCI is required.

SUMMARY

Some embodiments advantageously provide methods and apparatuses for performing HARQ-ACK feedback and CSI reporting for concurrent services with different reliability and/or latency requirements (e.g., eMBB and URLLC).

In a first embodiment, a plurality of sets of beta offset values can be configured, and for each set of beta offset values, a plurality of subsets of beta offset values are defined for HARQ-ACK feedback, and each subset of beta offset values are associated with a service type.

In a second embodiment, a plurality of sets of beta offset values can be configured, and for each set of beta offset values, a plurality of subsets of beta offset values can be defined for CSI feedback; the subsets of beta offset values may be associated with one or more parameters configured in the CSI report configuration.

Advantages of some embodiments of the present invention may include reducing the overhead for UCI (e.g., HARQ-ACK feedback and CSI feedback), thus improving the spectrum efficiency of uplink communications. Other advantages of some embodiments of the present invention may include, but are not limited to, improving the CSI report reliability when the WD supports concurrent/simultaneous services with different reliability and/or latency requirements.

According to one aspect of the present disclosure, a network node configured to communicate with a wireless device, WD, is provided. The network node comprises processing circuitry configured to configure at least one set of beta offset values, for each of the at least one set of beta offset values, at least one subset of beta offset values being defined for information corresponding to Uplink Control Information, UCI, and being associated with at least one service type.

In some embodiments of this aspect, the at least one service type includes a first service type and a second service type, the second service type being different from the first service type. In some embodiments of this aspect, the first service type is an enhanced Mobile Broadband, eMBB, service and the second service type is an Ultra Reliable Low Latency Communications, URLLC, service. In some embodiments of this aspect, the information corresponding to the UCI includes a Hybrid Automatic Repeat request, HARQ, feedback. In some embodiments of this aspect, the at least one subset of beta offset values is associated with the at least one service type according to at least one transmission parameter of at least one of at least one control channel and at least one data channel. In some embodiments of this aspect, at least one transmission rule is defined for the information when data corresponding to the information is transmitted concurrently for each of the at least one service type. In some embodiments of this aspect, the at least one transmission rule includes at least one of a priority transmission rule and a Channel State Information, CSI, report grouping rule. In some embodiments of this aspect, a first one of the at least one subset of beta offset values is used to transmit data corresponding to the information for a first service type of the at least one service type and a second one of the at least one subset of beta offset values is used to transmit data corresponding to the information for a second service type of the at least one service type.

In some embodiments of this aspect, the information corresponding to the UCI includes a Channel State Information, CSI, feedback. In some embodiments of this aspect, the at least one subset of beta offset values is associated with the at least one service type according to at least one parameter configured in a Channel State Information, CSI, report configuration. In some embodiments of this aspect, the at least one subset of beta offset values is associated with the at least one service type according to a target block error rate, BLER.

According to another aspect of the present disclosure, a method for a network node is provided. The method comprises configuring at least one set of beta offset values, for each of the at least one set of beta offset values, at least one subset of beta offset values being defined for information corresponding to Uplink Control Information, UCI, and being associated with at least one service type.

In some embodiments of this aspect, the at least one service type includes a first service type and a second service type, the second service type being different from the first service type. In some embodiments of this aspect, the first service type is an enhanced Mobile Broadband, eMBB, service and the second service type is an Ultra Reliable Low Latency Communications, URLLC, service. In some embodiments of this aspect, the information corresponding to the UCI includes a Hybrid Automatic Repeat request, HARQ, feedback. In some embodiments of this aspect, the at least one subset of beta offset values is associated with the at least one service type according to at least one transmission parameter of at least one of at least one control channel and at least one data channel. In some embodiments of this aspect, at least one transmission rule is defined for the information when data corresponding to the information is transmitted concurrently for each of the at least one service type. In some embodiments of this aspect, the at least one transmission rule includes at least one of a priority transmission rule and a Channel State Information, CSI, report grouping rule.

In some embodiments of this aspect, a first one of the at least one subset of beta offset values is used to transmit data corresponding to the information for a first service type of the at least one service type and a second one of the at least one subset of beta offset values is used to transmit data corresponding to the information for a second service type of the at least one service type. In some embodiments of this aspect, the information corresponding to the UCI includes a Channel State Information, CSI, feedback. In some embodiments of this aspect, the at least one subset of beta offset values is associated with the at least one service type according to at least one parameter configured in a Channel State Information, CSI, report configuration. In some embodiments of this aspect, the at least one subset of beta offset values is associated with the at least one service type according to a target block error rate, BLER.

According to another aspect, a wireless device, WD, configured to communicate with a network node is provided. The WD comprises processing circuitry configured to obtain a configuration of at least one set of beta offset values, for each of the at least one set of beta offset values, the configuration being associated with at least one subset of beta offset values, the at least one subset of beta offset values being defined for information corresponding to Uplink Control Information, UCI, and being associated with at least one service type.

In some embodiments of this aspect, the at least one service type includes a first service type and a second service type, the second service type being different from the first service type. In some embodiments of this aspect, the first service type is an enhanced Mobile Broadband, eMBB, service and the second service type is an Ultra Reliable Low Latency Communications, URLLC, service. In some embodiments of this aspect, the information corresponding to the UCI includes a Hybrid Automatic Repeat request, HARQ, feedback. In some embodiments of this aspect, the at least one subset of beta offset values is associated with the at least one service type according to at least one transmission parameter of at least one of at least one control channel and at least one data channel. In some embodiments of this aspect, the WD is further configured to transmit data corresponding to the information according to at least one transmission rule, the at least one transmission rule being defined for the information when the data corresponding to the information is to be transmitted concurrently for each of the at least one service type. In some embodiments of this aspect, the at least one transmission rule includes at least one of a priority transmission rule and a Channel State Information, CSI, report grouping rule.

In some embodiments of this aspect, a first one of the at least one subset of beta offset values is used to transmit data corresponding to the information for a first service type of the at least one service type and a second one of the at least one subset of beta offset values is used to transmit data corresponding to the information for a second service type of the at least one service type. In some embodiments of this aspect, the information corresponding to the UCI includes a Channel State Information, CSI, feedback. In some embodiments of this aspect, the at least one subset of beta offset values is associated with the at least one service type according to at least one parameter configured in a Channel State Information, CSI, report configuration. In some embodiments of this aspect, the at least one subset of beta offset values is associated with the at least one service type according to a target block error rate, BLER.

According to yet another aspect, a method for a wireless device, WD, is provided. The method includes obtaining a configuration of at least one set of beta offset values, for each of the at least one set of beta offset values, the configuration being associated with at least one subset of beta offset values, the at least one subset of beta offset values being defined for information corresponding to Uplink Control Information, UCI, and being associated with at least one service type.

In some embodiments of this aspect, the at least one service type includes a first service type and a second service type, the second service type being different from the first service type. In some embodiments of this aspect, the first service type is an enhanced Mobile Broadband, eMBB, service and the second service type is an Ultra Reliable Low Latency Communications, URLLC, service. In some embodiments of this aspect, the information corresponding to the UCI includes a Hybrid Automatic Repeat request, HARQ, feedback. In some embodiments of this aspect, the at least one subset of beta offset values is associated with the at least one service type according to at least one transmission parameter of at least one of at least one control channel and at least one data channel. In some embodiments of this aspect, the method further includes transmitting data corresponding to the information according to at least one transmission rule, the at least one transmission rule being defined for the information when the data corresponding to the information is to be transmitted concurrently for each of the at least one service type. In some embodiments of this aspect, the at least one transmission rule includes at least one of a priority transmission rule and a Channel State Information, CSI, report grouping rule.

In some embodiments of this aspect, a first one of the at least one subset of beta offset values is used to transmit data corresponding to the information for a first service type of the at least one service type and a second one of the at least one subset of beta offset values is used to transmit data corresponding to the information for a second service type of the at least one service type. In some embodiments of this aspect, the information corresponding to the UCI includes a Channel State Information, CSI, feedback. In some embodiments of this aspect, the at least one subset of beta offset values is associated with the at least one service type according to at least one parameter configured in a Channel State Information, CSI, report configuration. In some embodiments of this aspect, the at least one subset of beta offset values is associated with the at least one service type according to a target block error rate, BLER.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a block diagram of an alternative embodiment of a host computer according to some embodiments of the present disclosure;

FIG. 4 is a block diagram of an alternative embodiment of a network node according to some embodiments of the present disclosure;

FIG. 5 is a block diagram of an alternative embodiment of a wireless device according to some embodiments of the present disclosure;

FIGS. 6-9 are flowcharts illustrating exemplary methods implemented in a communication system including a host computer, a network node and a wireless device according to some embodiments of the present disclosure;

DETAILED DESCRIPTION

Figure 1:
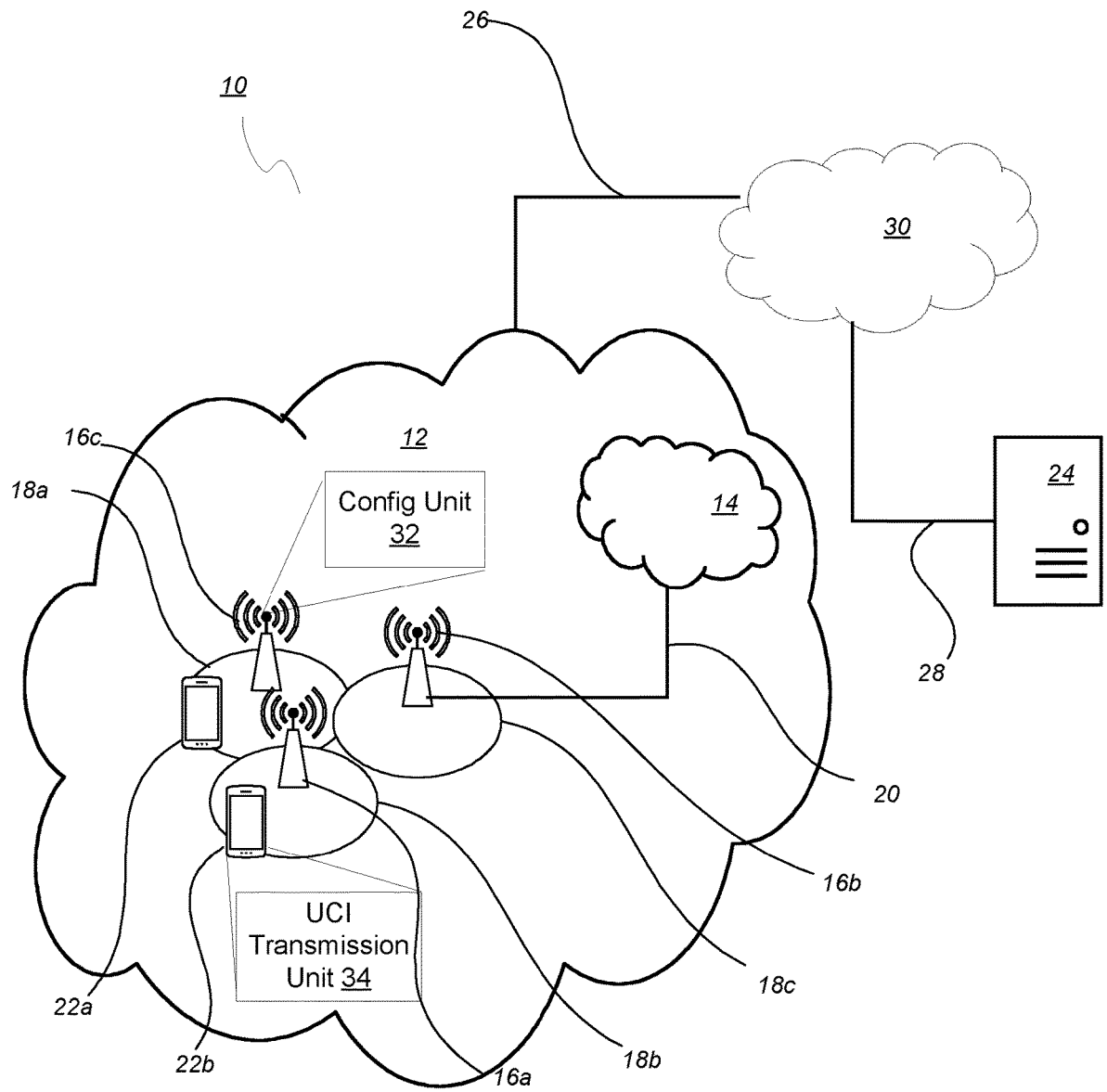
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to transmission for URLLC UCI. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE, may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for methods and apparatuses for performing HARQ-ACK feedback and CSI reporting for concurrent services with different reliability and/or latency requirements (e.g., eMBB and URLLC). One potential solution to one or more of the problems discussed herein above is that part of the sets of beta offset values may be configured for eMBB and another part of the sets of beta offset values may be configured for URLLC; and dynamic signaling may be used to indicate the beta offset set according to the service type.

In a first embodiment of the present disclosure, at least one set of beta offset values can be configured, and for each of the at least one set of beta offset values, at least one subset of beta offset values is defined for HARQ-ACK feedback, and each of the at least one subset of beta offset values is associated with a service type. In one embodiment, the at least one set of beta offset values includes a plurality of beta offset values and/or the at least one subset of beta offset values includes a plurality of subsets of beta offset values. In a second embodiment, at least one set of beta offset values can be configured, and for each of the at least one set of beta offset values, at least one subset of beta offset values can be defined for CSI feedback; the at least one subset of beta offset values may be associated with one or more parameters configured in the CSI report configuration. Advantages of some embodiments of the present invention may include reducing the overhead for UCI (e.g., HARQ-ACK feedback and CSI feedback), thus improving the spectrum efficiency of uplink communications. Other advantages of some embodiments of the present invention may include, but are not limited to, improving the CSI report reliability when the WD supports concurrent/simultaneous services with different reliability and/or latency requirements.

Returning to the drawing figures, in which like elements are referred to by like reference designators, there is shown in FIG. 1 a schematic diagram of a communication system, according to an embodiment, including a communication system 10, such as a 3GPP-type cellular network, which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to configure at least one set of beta offset values, for each of the at least one set of beta offset values, at least one subset of beta offset values being defined for information corresponding to Uplink Control Information (UCI) and being associated with at least one service type.

A wireless device 22 is configured to include a UCI Transmission unit 34 which is configured to obtain a configuration of at least one set of beta offset values, for each of the at least one set of beta offset values, the configuration being associated with at least one subset of beta offset values, the at least one subset of beta offset values being defined for information corresponding to Uplink Control Information (UCI) and being associated with at least one service type.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to monitor the network node 16 and/or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to a traditional processor and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to configure at least one set of beta offset values, for each of the at least one set of beta offset values, at least one subset of beta offset values being defined for information corresponding to Uplink Control Information (UCI) and being associated with at least one service type.

In some embodiments, the terms "configure" and/or "configuring" includes identifying one or more service types associated with a WD 22 (e.g., concurrent service types in both eMBB and URLLC) using one or more of the techniques described herein and communicating an indication of which of the at least one subset of beta offset values to use for UCI to the WD 22 using one or more of the techniques described herein. In some embodiments, the at least one service type includes a first service type and a second service type, the second service type being different from the first service type. In some embodiments, the first service type is an enhanced Mobile Broadband (eMBB) service and the second service type is an Ultra Reliable Low Latency Communications (URLLC) service. In some embodiments, the information corresponding to the UCI includes a Hybrid Automatic Repeat reQuest (HARQ) feedback. In some embodiments, the at least one subset of beta offset values is associated with the at least one service type according to at least one transmission parameter of at least one of at least one control channel and at least one data channel. In some embodiments, at least one transmission rule is defined for the information when data corresponding to the information is transmitted concurrently for each of the at least one service type. In some embodiments, the at least one transmission rule includes at least one of a priority transmission rule and a Channel State Information (CSI) report grouping rule. In some embodiments, a first one of the at least one subset of beta offset values is used to transmit data corresponding to the information for a first service type of the at least one service type and a second one of the at least one subset of beta offset values is used to transmit data corresponding to the information for a second service type of the at least one service type. In some embodiments, the information corresponding to the UCI includes a CSI feedback. In some embodiments, the at least one subset of beta offset values is associated with the at least one service type according to at least one parameter configured in a CSI report configuration. In some embodiments, the at least one subset of beta offset values is associated with the at least one service type according to a target block error rate (BLER). The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to a traditional processor and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a UCI transmission unit 34 configured to obtain a configuration of at least one set of beta offset values, for each of the at least one set of beta offset values, the configuration being associated with at least one subset of beta offset values, the at least one subset of beta offset values being defined for information corresponding to Uplink Control Information (UCI) and being associated with at least one service type.

In some embodiments, the terms "obtain" and/or "obtaining" includes receiving an indication from a network node 16 serving the WD 22 that can be used by the WD 22 for UCI according to one or more of the techniques described herein, and, in other embodiments, such terms include the WD 22 determining the configuration based at least in part on information known by the WD 22. In some embodiments, the at least one service type includes a first service type and a second service type, the second service type being different from the first service type. In some embodiments, the first service type is an enhanced Mobile Broadband (eMBB) service and the second service type is an Ultra Reliable Low Latency Communications (URLLC) service. In some embodiments, the information corresponding to the UCI includes a Hybrid Automatic Repeat reQuest (HARQ) feedback. In some embodiments, the at least one subset of beta offset values is associated with the at least one service type according to at least one transmission parameter of at least one of at least one control channel and at least one data channel. In some embodiments, the WD 22 is further configured to transmit data corresponding to the information according to at least one transmission rule, the at least one transmission rule being defined for the information when the data corresponding to the information is to be transmitted concurrently for each of the at least one service type.

In some embodiments, the at least one transmission rule includes at least one of a priority transmission rule and a Channel State Information (CSI) report grouping rule. In some embodiments, a first one of the at least one subset of beta offset values is used to transmit data corresponding to the information for a first service type of the at least one service type and a second one of the at least one subset of beta offset values is used to transmit data corresponding to the information for a second service type of the at least one service type. In some embodiments, the information corresponding to the UCI includes a CSI feedback. In some embodiments, the at least one subset of beta offset values is associated with the at least one service type according to at least one parameter configured in a CSI report configuration. In some embodiments, the at least one subset of beta offset values is associated with the at least one service type according to a target block error rate (BLER). In some embodiments, the inner workings of the network node 16, WD 22, and host computer 24 may be as shown in FIG. 2 and independently, the surrounding network topology may be that of FIG. 1.

Figure 2:
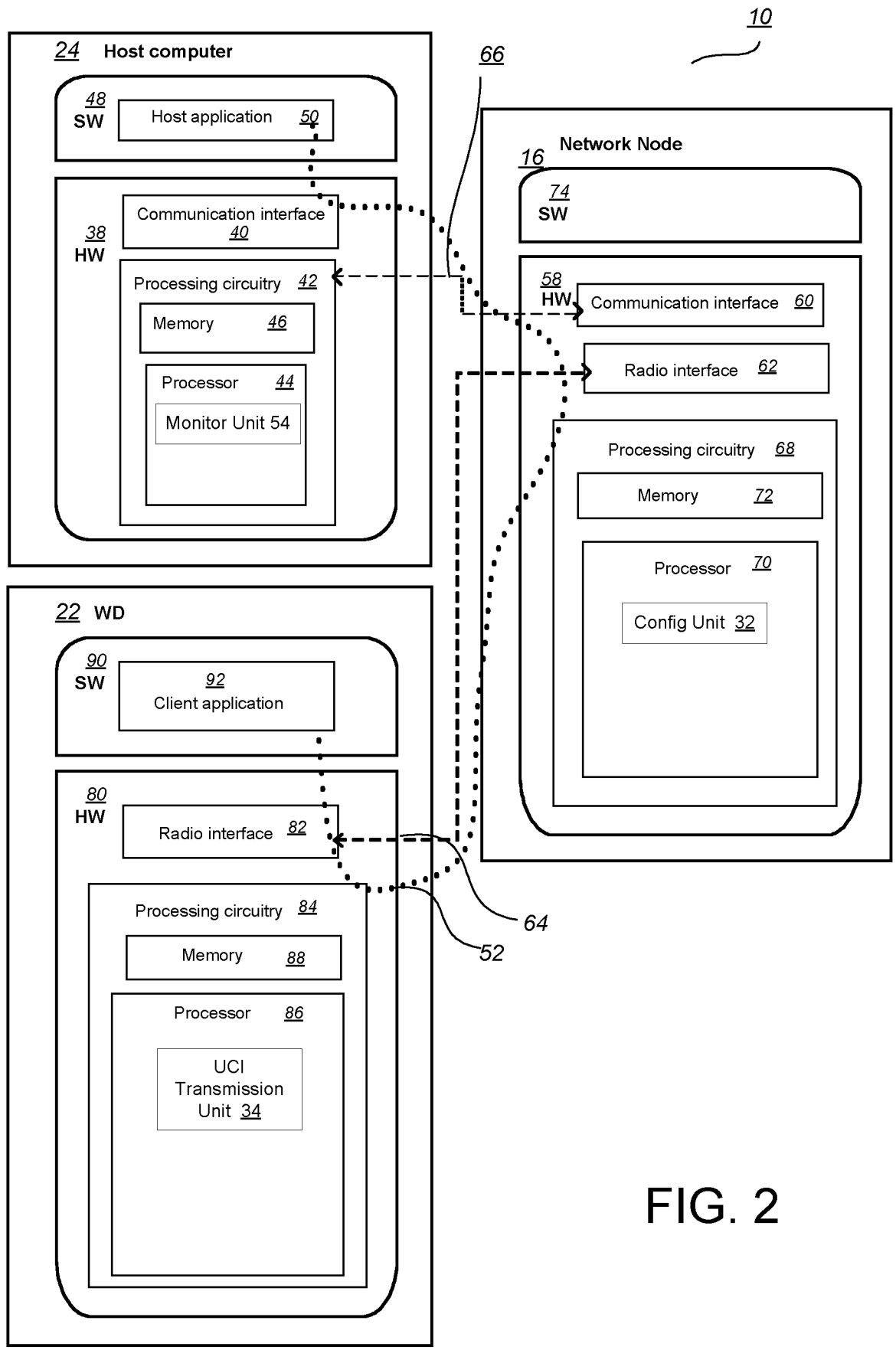
FIG. 2 is a block diagram of a host computer communicating via a network node with a wireless device over an at least partially wireless connection according to some embodiments of the present disclosure.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Although FIGS. 1 and 2 show various "units" such as the configuration unit 32, and UCI transmission unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a block diagram of an alternative host computer 24, which may be implemented at least in part by software modules containing software executable by a processor to perform the functions described herein. The host computer 24 include a communication interface module 41 configured to set up and maintain a wired or wireless connection with an interface of a different communication device of the communication system 10. The memory module 47 is configured to store data, programmatic software code and/or other information described herein. Monitor module 55 is configured to enable the service provider to monitor the network node 16 and/or the wireless device 22.

FIG. 4 is a block diagram of an alternative network node 16, which may be implemented at least in part by software modules containing software executable by a processor to perform the functions described herein. The network node 16 includes a radio interface module 63 configured for setting up and maintaining at least a wireless connection 64 with a WD 22 located in a coverage area 18 served by the network node 16. The network node 16 also includes a communication interface module 61 configured for setting up and maintaining a wired or wireless connection with an interface of a different communication device of the communication system 10. The communication interface module 61 may also be configured to facilitate a connection 66 to the host computer 24. The memory module 73 that is configured to store data, programmatic software code and/or other information described herein. The configuration module 33 is configured to configure at least one set of beta offset values, for each of the at least one set of beta offset values, at least one subset of beta offset values being defined for information corresponding to Uplink Control Information (UCI) and being associated with at least one service type.

FIG. 5 is a block diagram of an alternative wireless device 22, which may be implemented at least in part by software modules containing software executable by a processor to perform the functions described herein. The WD 22 includes a radio interface module 83 configured to set up and maintain a wireless connection 64 with a network node 16 serving a coverage area 18 in which the WD 22 is currently located. The memory module 89 is configured to store data, programmatic software code and/or other information described herein. The UCI Transmission module 35 is configured to obtain a configuration of at least one set of beta offset values, for each of the at least one set of beta offset values, the configuration associated with at least one subset of beta offset values being defined for information corresponding to Uplink Control Information (UCI) and being associated with at least one service type.

FIG. 6 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 74 executed by the host computer 24 (block S108).

FIG. 7 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

FIG. 8 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 9 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 10:
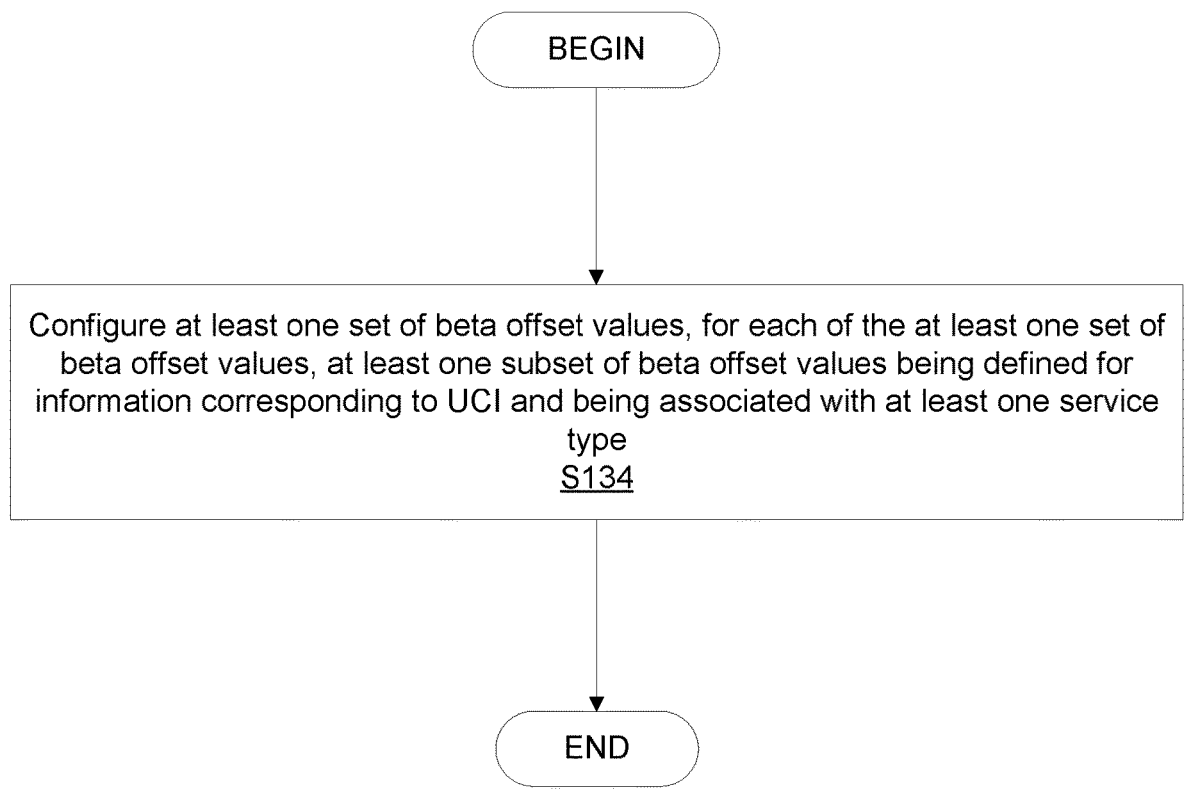
FIG. 10 is a flowchart of an exemplary process in a network node for configuring beta offset values according to some embodiments of the present disclosure.

FIG. 10 is a flowchart of an exemplary process in a network node 16 for configuring (Block S134), such as via processing circuitry 68 and/or configuration unit 32, at least one set of beta offset values, for each of the at least one set of beta offset values, at least one subset of beta offset values being defined for information corresponding to Uplink Control Information (UCI) and being associated with at least one service type.

In some embodiments, the at least one service type includes a first service type and a second service type, the second service type being different from the first service type. In some embodiments, the first service type is an enhanced Mobile Broadband (eMBB) service and the second service type is an Ultra Reliable Low Latency Communications (URLLC) service. In some embodiments, the information corresponding to the UCI includes a Hybrid Automatic Repeat reQuest (HARQ) feedback. In some embodiments, the at least one subset of beta offset values is associated with the at least one service type according to at least one transmission parameter of at least one of at least one control channel and at least one data channel. In some embodiments, at least one transmission rule is defined for the information when data corresponding to the information is transmitted concurrently for each of the at least one service type. In some embodiments, the at least one transmission rule includes at least one of a priority transmission rule and a Channel State Information (CSI) report grouping rule. In some embodiments, a first one of the at least one subset of beta offset values is used to transmit data corresponding to the information for a first service type of the at least one service type and a second one of the at least one subset of beta offset values is used to transmit data corresponding to the information for a second service type of the at least one service type. In some embodiments, the information corresponding to the UCI includes a CSI feedback. In some embodiments, the at least one subset of beta offset values is associated with the at least one service type according to at least one parameter configured in a CSI report configuration. In some embodiments, the at least one subset of beta offset values is associated with the at least one service type according to a target block error rate (BLER).

Figure 11:
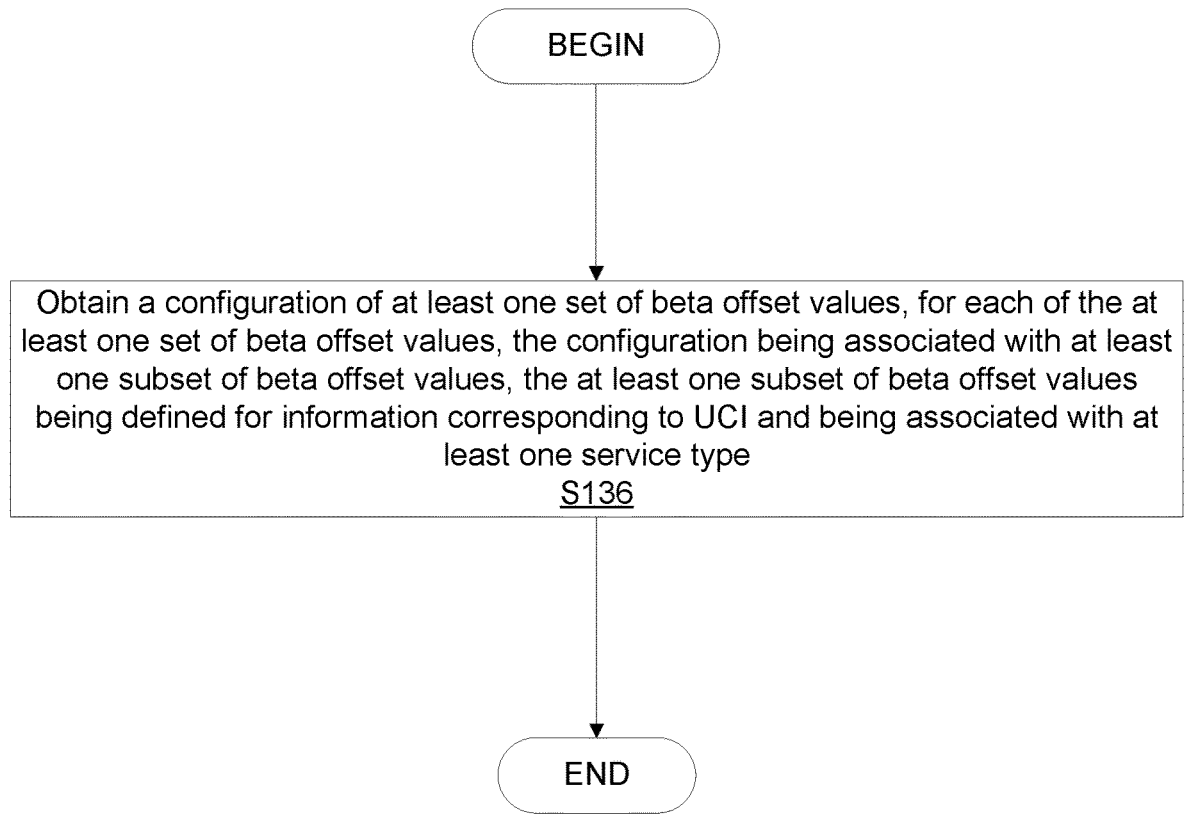
FIG. 11 is a flowchart of an exemplary process in a wireless device for obtaining a configuration of beta offset values for UCI according to some embodiments of the present disclosure.

FIG. 11 is a flowchart of an exemplary process in a wireless device 22 for obtaining (Block S136), such as via processing circuitry 84 and/or UCI transmission unit 34, a configuration of at least one set of beta offset values. In some embodiments, for each of the at least one set of beta offset values, the configuration associated with at least one subset of beta offset values, the at least one subset of beta offset values is defined for information corresponding to Uplink Control Information (UCI). In some embodiments, the at least one subset of beta offset values is associated with at least one service type.

In some embodiments, the at least one service type includes a first service type and a second service type, the second service type being different from the first service type. In some embodiments, the first service type is an enhanced Mobile Broadband (eMBB) service and the second service type is an Ultra Reliable Low Latency Communications (URLLC) service. In some embodiments, the information corresponding to the UCI includes a Hybrid Automatic Repeat reQuest (HARQ) feedback. In some embodiments, the at least one subset of beta offset values is associated with the at least one service type according to at least one transmission parameter of at least one of at least one control channel and at least one data channel. In some embodiments, the method further includes transmitting, such as via radio interface 82, data corresponding to the information according to at least one transmission rule, the at least one transmission rule being defined for the information when the data corresponding to the information is to be transmitted concurrently for each of the at least one service type. In some embodiments, the at least one transmission rule includes at least one of a priority transmission rule and a Channel State Information (CSI) report grouping rule. In some embodiments, a first one of the at least one subset of beta offset values is used to transmit data corresponding to the information for a first service type of the at least one service type and a second one of the at least one subset of beta offset values is used to transmit data corresponding to the information for a second service type of the at least one service type. In some embodiments, the information corresponding to the UCI includes a CSI feedback. In some embodiments, the at least one subset of beta offset values is associated with the at least one service type according to at least one parameter configured in a CSI report configuration. In some embodiments, the at least one subset of beta offset values is associated with the at least one service type according to a target block error rate (BLER).

Having described some embodiments of the present disclosure, more detailed descriptions of some embodiments are provided herein below as follows.

Some embodiments provide methods and apparatuses for communicating information for UCI (e.g., HARQ-ACK feedback, CSI reporting, etc.) for concurrent services associated with a WD 22, the concurrent services having different reliability and/or latency requirements (e.g., eMBB and URLLC).

In the first embodiment, at least one set of beta offset values can be configured, and for each set of beta offset values, at least one subset of beta offset values is defined for HARQ-ACK feedback. As one further implementation of the first embodiment, each subset of beta offset values may be associated with one service type. As one example, one subset of beta offset values is associated with one service type, and the other subset of beta offset values is associated with the other service type. In a further example, one service type may be eMBB and the other service type may be URLLC.

There may be provided one or more techniques for the association of service types to subsets of beta offset values. As one example of such association, the subset of beta offset values may be associated with the indicator indicated in the DCI. For example, when the data is for eMBB services, the indicator may be "1" and otherwise, the indicator may be "0". In such cases, when the indicator is "1", the first subset of beta offset values may be used for HARQ-ACK feedback; otherwise, the second subset of beta offset values may be used for HARQ-ACK feedback.

As another example of the association of service types to subsets of beta offset values, the subset of beta offset values may be associated with the transmission parameters of one or more of control channels and data channels, in which the transmission parameters may include one or more of:
Aggregation level
  as one example, when the aggregation level is {1, 2, 4}, the first subset of beta offset values may be used and when the aggregation level is {8, 16}, the second subset of beta offset values may be used;

DCI format
- as one example, when the DCI is a non-compacted DCI, the first subset of beta offset values is used and when the DCI is a compacted DCI, the second subset of beta offset values may be used;

CRC length
- as one example, when the cyclic redundancy check (CRC) of PDCCH is 19 bits, the first subset of beta offset values may be used and when the CRC of PDCCH is more than 19 bits, the second subset of beta offset values may be used;

CORESET/search space/PDCCH monitoring parameters
- as one example, when the PDCCH is configured to be non-repetitive, the first subset of beta offset values may be used and when the PDCCH is configured to be repetitive, the second subset of beta offset values may be used;
- as another example, a plurality of CORESETs/search spaces/PDCCH monitoring occasions are defined. One (group of) CORESET/search space/PDCCH monitoring occasion may be associated with the first subset of beta offset values and the second (group of) CORESET/search space/PDCCH monitoring occasion may be associated with the second subset of beta offset values. When PDCCH is transmitted over the first (group of) CORESET/search space/PDCCH monitoring occasion, the first subset of beta offset values for HARQ-ACK may be used; otherwise, the second subset of beta offset values may be used for HARQ-ACK.
- as yet another example, a plurality of CORESETs may be configured with the first one or more of modulation and coding scheme (MCS) table and transport block size (TBS) parameters, and another plurality of CORESETs may be configured with the second one or more of MCS table and TBS parameters. In one embodiment, the first one or more of MCS table and TBS parameters may be associated with eMBB transmission and the second one or more of MCS table and TBS parameters may be associated with URLLC transmission. Accordingly, when PDCCH is transmitted over the first plurality of CORESETs, the first subset of beta offset values may be used; otherwise, the second subset of beta offset values may be used;

Radio Network Temporary Identifier (RNTI) of the PDCCH
- as one example, one (set of) RNTI of the PDCCH may be associated with the first subset of beta offset values and the second (set of) RNTI of the PDCCH may be associated with the second subset of beta offset values;

Uplink (UL) carrier index;

Bandwidth Part (BWP) information;

PUSCH/PDSCH coding scheme if different coding schemes are defined for different service classes
- as one example, low density parity check code (LDPC) may be defined for eMBB and polar code may be defined for URLLC; thus, when the LDPC is indicated, the first subset of beta offset values may be used and when polar code is indicated, the second subset of beta offset values may be used. The indication may, in some embodiments, be explicitly indicated in the DCI, or may, in other embodiments, be implicitly derived from other transmission parameters, such as one or more of MCS and TBS parameters and/or CORESET parameters;

MCS tables
- as one example, where service-specific MCS tables are defined, if the MCS table for high reliability (i.e., URLLC) is used, the beta offset subset associated with high reliability may be used; otherwise, the other beta offset subset may be used;

Parameters of the scheduled Downlink (DL) transmission
- If the scheduled PDSCH, or its scheduling PDCCH transmission used physical layer parameters for high reliability, the subset of beta values associated with high reliability may be used for PUSCH if the piggybacked UCI carries ACK/NACK related to the high reliability DL transmission; otherwise another subset of beta values not associated with high reliability may be used. In one embodiment, if UCI on the PUSCH carries a HARQ codebook with multiple ACK/NACK bits, the high reliability beta offset subset may be used if at least one (or a number larger than a threshold) ACK/NACK acknowledges a high reliability DL transmission. Examples of physical layer parameters indicating a reliable PDSCH transmission include all PDCCH parameters as discussed above, a reliable PDSCH MCS setting, Type B PDSCH scheduling (indicating low latency), a certain Multiple Input Multiple Output (MIMO) or Demodulation Reference Signal (DM-RS) setting, a DL BWP or DL numerology, PDSCH coding scheme (if different coding schemes are defined for different service classes); etc.

The above techniques for the association of service types to subsets of beta offset values maybe predefined in some embodiments, or, in other embodiments, RRC configured or configured by a MAC Control Element (MAC CE).

In a further embodiment of the first embodiment, at least one transmission rule is defined for HARQ-ACK feedback when HARQ-ACK for one type of service (e.g., eMBB) is concurrent with another type of service (e.g., URLLC). As one implementation of the transmission rules, the first subset of beta offset values may be used for HARQ-ACK transmission for the first service type and the second subset of beta offset values may be used for the HARQ-ACK transmission for the second service type. As another implementation of the transmission rules, the second subset of beta offset values may be applied to both service types for eMBB HARQ feedback and URLLC HARQ feedback.

As another implementation of transmission rules, the HARQ-ACK transmission for the first service type may be dropped and HARQ-ACK transmission for the second service type may be transmitted with the second subset of beta offset values. As yet another implementation, the HARQ-ACK transmission for the second service type may be prioritized and may be transmitted with the second subset of beta offset values, and the HARQ-ACK transmission for the first service type may be transmitted with the first subset of beta offset values if the total required resource is lower than a threshold; otherwise, the beta offset values for HARQ-ACK transmission of the first service type is scaled down so that the total required resource is lower than the threshold. As a further implementation, a second threshold may be given if the beta offset values for HARQ-ACK transmission of the first service type is scaled down and if the beta offset values are smaller than the second threshold, the HARQ-ACK transmission of the first service type may be dropped.

In the second embodiment, at least one set of beta offset values can be configured, and for each set of beta offset values, at least one subset of beta offset values can be defined for CSI feedback.

As one further implementation of the second embodiment, the subsets of beta offset values may be associated with one or more parameters configured in the CSI report configuration. According to some agreements, the CSI report configuration may include one or more of:

ReportConfigId;

ReportConfigType;

ReportQuantity;

ReportFreqConfiguration;

MeasRestrictionTimeForChannel;

MeasRestrictionTimeForInterference;

CodebookConfig;

nrofCQIsPerReport;

group-based-beam-reporting;

CQI-Table;

SubbandSize; and

BLER_Target.

As one example, it may be assumed that the subsets of beta offset values are associated with the BLER_Target (also called target block error rate, target BLER, and BLER target), with the first subset of beta offset values being associated with a first BLER_Target (e.g., BLER_Target=10^(−1)) and the second subset of beta offset values being associated with a second BLER_Target (e.g., BLER_Target=10^(−5)). The first BLER_Target may be configured for CSI reporting for eMBB-related PDSCH/PDCCH transmission and the second BLER_Target may be configured for CSI reporting for URLLC-related PDSCH/PDCCH transmission. In one embodiment, when the CSI is reported for eMBB-related PDSCH/PDCCH transmission, the first subset of beta offset values may be used, and when the CSI is reported for URLLC-related PDSCH/PDCCH transmission, the second subset of beta offset values may be used. One example is shown herein below in Table 2.

TABLE 2

Beta Offset Values Configurations for Different Sets and Subsets

| Set k (k = 0, 1, 2, 3) | For Ack | $\beta_{ack}^{(k,0)}$ | When the number of HARQ-ACK bits OACK ≤ 2 | When the data is associated with eMBB |
|---|---|---|---|---|
| | | $\beta_{ack}^{(k,1)}$As | When the number of HARQ-ACK bits falls into [3] ≤ OACK ≤ [11] | When the data is associated with eMBB |
| | | $\beta_{ack}^{(k,2)}$ | When the number of HARQ-ACK bits OACK > [11] | When the data is associated with eMBB |
| | | $\beta_{ack}^{(k,0)'}$ | When the number of HARQ-ACK bits OACK ≤ 2 | When the data is associated with URLLC |
| | | $\beta_{ack}^{(k,1)'}$ | When the number of HARQ-ACK bits falls into [3] ≤ OACK ≤ [11] | When the data is associated with URLLC |
| | | $\beta_{ack}^{(k,2)'}$ | When the number of HARQ-ACK bits OACK > [11] | When the data is associated with URLLC |
| | For CSI | $\beta_{CSI}^{(k,0)}$ | Regardless CSI type 1 or 2, when the number of bits for CSI part 1 OCSI_part1 ≤ [11] | For BLER_Target = 10^−1 |
| | | $\beta_{CSI}^{(k,1)}$ | Regardless CSI type 1 or 2, when the number of bits for CSI part 1 OCSI_part1 > [11] | For BLER_Target = 10^−1 |
| | | $\beta_{CSI}^{(k,2)}$ | Regardless CSI type 1 or 2, when the number of bits for CSI part 2 OCSI_part2 ≤ [11] | For BLER_Target = 10^−1 |
| | | $\beta_{CSI}^{(k,3)}$ | Regardless CSI type 1 or 2, when the number of bits for CSI part 2 OCSI_part2 > [11] | For BLER_Target = 10^−1 |
| | | $\beta_{CSI}^{(k,0)'}$ | Regardless CSI type 1 or 2, when the number of bits for CSI part 1 OCSI_part1 ≤ [11] | For BLER_Target = 10^−5 |
| | | $\beta_{CSI}^{(k,1)'}$ | Regardless CSI type 1 or 2, when the number of bits for CSI part 1 OCSI_part1 > [11] | For BLER_Target = 10^−5 |
| | | $\beta_{CSI}^{(k,2)'}$ | Regardless CSI type 1 or 2, when the number of bits for CSI part 2 OCSI_part2 ≤ [11] | For BLER_Target = 10^−5 |
| | | $\beta_{CSI}^{(k,3)'}$ | Regardless CSI type 1 or 2, when the number of bits for CSI part 2 OCSI_part2 > [11] | For BLER_Target = 10^−5 |

Two (2) bits in DCI may be used to inform which set are used for the final beta offset value.
Beta offset value may be configured via RRC.

In the third embodiment, at least one transmission rule may be defined for CSI feedback, in which the at least one transmission rule may be at least associated with one or more of a configured BLER-Target and/or a configured CQI-Table. As one further implementation of the third embodiment, at least one transmission rule is or includes a plurality of priority rules. As one implementation, a CSI report with a lower BLER target may be configured with a higher priority than a CSI report with a higher BLER target. In one embodiment, when CSI reports with different BLER targets is transmitted at the same time (concurrently/simultaneously), the transmission with higher priority may be prioritized and the transmission with lower priority is down prioritized. As one example of the implementation of the prioritization, when CSI reports with different BLER targets are transmitted at the same time, the CSI report with higher priority is transmitted and the CSI report with lower priority is dropped. As another example of the implementation of the prioritization, a CSI report is omitted level by level beginning with the lowest priority level until the lowest priority level is reached, which may cause the UCI code rate to be less than or equal to a given threshold, in some embodiments.

As one further embodiment of the third embodiment, CSI reports with the same BLER target may be grouped into, for example, a CSI report group. In one embodiment, the CSI report group priority may be proportional to the CSI report group BLER target. For example, a CSI report group may have a higher priority when the associated CSI report BLER target is lower, as compared to the BLER target(s) for other CSI reports transmitted concurrently therewith. The transmission in the CSI report group with higher priority is prioritized when two CSI report is transmitted at the same time. For the CSI reports, a plurality of alternatives may be used for the CSI reports' encoding. As one alternative, the CSI reports in the same CSI report group may be encoded jointly, and the CSI reports in one or more different CSI report groups may be encoded separately. As yet another alternative, the CSI reports for different report groups may be encoded jointly in some embodiments.

In one embodiment of the third embodiment, for CSI reports, a CSI report may comprise a plurality of parts. As one example of such embodiment, two parts are given in the following description. For Type I CSI feedback on the PUSCH, a CSI report may comprise up to two parts. Part 1 may include Rank Indication (RI/CRI), Channel Quality Indicator (CQI) for the first codeword. Part 2 may include PMI and may include the CQI for the second codeword when RI>4. For Type II CSI feedback on PUSCH, a CSI report may comprise up to two parts. Part 1 may be used to identify the number of information bits in Part 2. Part 1 may have a fixed payload size and may include RI, CQI, and an indication of the number of non-zero wideband amplitude coefficients per layer for the Type II CSI. The fields of Part 1—RI, CQI, and the indication of the number of non-zero wideband amplitude coefficients for each layer—may be separately encoded. Part 2 may include the PMI of the Type II CSI. Part 1 and 2 may in some embodiments be separately encoded.

As another further embodiment of the third embodiment, when a CSI report comprises a plurality of parts, at least one transmission rule may be defined for the CSI report parts. As one example shown in Table 3 herein below, CSI reports with the same BLER target may be grouped. As shown in the exemplary table, Table 3, Part I for the CSI report group with lower BLER target has the highest priority; Part I for CSI report group with higher BLER target has the second highest priority; Part II for the CSI report group with the lower BLER target has the third highest priority; and the Part II for CSI report group with the higher BLER target has the lowest priority. With this priority ordering, coarse link adaptation can be performed both for eMBB and URLLC in some embodiments.

TABLE 3

Priority Reporting Levels for CSI Reports

Priority 0:
Part 1 for CSI report group with lower BLER target
(i.e., BLER_Target = $10^{-5}$)
Priority 1:
Part 1 for CSI report group with higher BLER target
(i.e., BLER_Target = $10^{-1}$)
Priority 2:
Part 2 for CSI report group with lower BLER target
(i.e., BLER_Target = $10^{-5}$)
Priority 3:
Part 2 for CSI report group with higher BLER target
(i.e., BLER_Target = $10^{-1}$)

In another embodiment, the priority reporting levels can also be provided as shown in Table 4. With this priority ordering shown in Table 4, URLLC CSI report can be guaranteed and the performance of URLLC can be improved, as compared to the embodiment shown in Table 3 where, for example, Part 1 for CSI report group with higher BLER target has a higher priority than Part 2 for CSI report group with lower BLER target.

TABLE 4

Priority Reporting Levels for CSI Reports

Priority 0:
Part 1 for CSI report group with lower BLER target
(i.e., BLER_Target = $10^{-5}$)
Priority 1:
Part 2 for CSI report group with lower BLER target
(i.e., BLER_Target = $10^{-5}$)
Priority 2:
Part 1 for CSI report group with higher BLER target
(i.e., BLER_Target = $10^{-1}$)
Priority 3:
Part 2 for CSI report group with higher BLER target
(i.e., BLER_Target = $10^{-1}$)

Within Part 2 for each CSI report group, a further priority order may be provided. One such example priority order is shown in Table 5 herein below, where $N_{Rep}$ is the number of CSI reports in one slot. Priority 0 is the highest priority and priority $2N_{Rep}$ is the lowest priority and the CSI report numbers correspond to the order of the associated ReportConfigID.

In some embodiments, for CSI reports, the WD may omit a portion of the lower priority CSI report based on Table 3 or Table 4, and further omission of Part 2 CSI may be according to the priority order shown in Table 5. When omitting Part 2 CSI information for a particular priority level, the WD may, in some embodiments, omit all of the information at that priority level.

TABLE 5

Priority Reporting Levels for Part 2 CSI

Priority 0:
Part 2 wideband CSI for CSI reports 1 to $N_{Rep}$
Priority 1:
Part 2 subband CSI of even subbands for CSI report 1
Priority 2:
Part 2 subband CSI of odd subbands for CSI report 1
Priority 3:
Part 2 subband CSI of even subbands for CSI report 2
Priority 4:
Part 2 subband CSI of odd subbands for CSI report 2
.
.
.
Priority $2N_{Rep}$ - 1:
Part 2 subband CSI of even subbands for CSI report $N_{Rep}$
Priority $2N_{Rep}$:
Part 2 subband CSI of odd subbands for CSI report $N_{Rep}$ In one embodiment, when the CSI is multiplexed with the UL-SCH on the PUSCH, Part 2 CSI may be omitted only when the UCI code rate for transmitting all of Part 2 would be greater than a threshold code rate $c_T$, where $$c_T = \frac{c_{MCS}}{\beta_{offset}^{CSI-2}}$$

$c_{MCS}$ is the target PUSCH code rate, e.g., a target rate from a known communications standard.

$\beta_{offset}^{CSI-2}$ is the CSI offset value given for the corresponding CSI report group.

In one embodiment, Part 2 CSI may be omitted level by level beginning with the lowest priority level until the lowest priority level is reached, which may cause the UCI code rate to be less than or equal to $c_T$.

As yet another example, Part 2 CSI may be omitted only when the code rate for PUSCH is modified more than a certain factor by sending UCI+PUSCH. In other words, if the change of the PUSCH code rate due to the UCI transmission exceeds a threshold, which may be a predetermined threshold (e.g., 10% higher than indicated in MCS) then the UCI is omitted.

In yet other embodiments of the present disclosure, all or a portion of the methods, apparatuses, and techniques described herein may also be used for data in the UCI other than CSI and HARQ-ACK, such as, for example, RI, PMI, etc.

Some additional embodiments may include one or more of the following:

Embodiment A1. A network node configured to communicate with a wireless device (WD), the network node configured to, and/or comprising a radio interface and/or comprising processing circuitry configured to configure at least one set of beta offset values, for each of the at least one set of beta offset values, at least one subset of beta offset values being defined for information corresponding to Uplink Control Information (UCI) and being associated with at least one service type.

Embodiment A2. The network node of Embodiment A1, wherein the at least one service type includes a first service type and a second service type, different from the first service type.

Embodiment A3. The network node of Embodiment A2, wherein the first service type is an enhanced Mobile Broadband (eMBB) service and the second service type is an Ultra Reliable Low Latency Communications (URLLC) service.

Embodiment A4. The network node of any of Embodiments A1 and A2, wherein the information corresponding to the UCI includes a Hybrid Automatic Repeat reQuest (HARQ) feedback.

Embodiment A5. The network node of any of Embodiments A1-A4, wherein the at least one subset of beta offset values is associated with the at least one service type according to at least one transmission parameter of at least one of at least one control channel and at least one data channel.

Embodiment A6. The network node of any of Embodiments A1-A5, wherein at least one transmission rule is defined for the information when data corresponding to the information is transmitted concurrently for each of the at least one service type.

Embodiment A7. The network node of Embodiment A6, wherein the at least one transmission rule includes at least one of a priority transmission rule and a Channel State Information (CSI) report grouping rule.

Embodiment A8. The network node of any of Embodiments A1-A7, wherein a first one of the at least one subset of beta offset values is used to transmit data corresponding to the information for a first service type of the at least one service type and a second one of the at least one subset of beta offset values is used to transmit data corresponding to the information for a second service type of the at least one service type.

Embodiment A9. The network node of any of Embodiments A1-A8, wherein the information corresponding to the UCI includes a CSI feedback.

Embodiment A10. The network node of Embodiment A9, wherein the at least one subset of beta offset values is associated with the at least one service type according to at least one parameter configured in a CSI report configuration.

Embodiment A11. The network node of any of Embodiments A9-A10, wherein the at least one subset of beta offset values is associated with the at least one service type according to a target block error rate (BLER).

Embodiment B1. A communication system including a host computer, the host computer comprising:

processing circuitry configured to provide user data; and a communication interface configured to forward the user data to a cellular network for transmission to a wireless device (WD), the cellular network comprising a network node having a radio interface and processing circuitry, the network node configured to, and/or the network node's processing circuitry configured to configure at least one set of beta offset values, for each of the at least one set of beta offset values, at least one subset of beta offset values being defined for information corresponding to Uplink Control Information (UCI) and being associated with at least one service type.

Embodiment B2. The communication system of Embodiment B1, further including the network node.

Embodiment B3. The communication system of Embodiment B2, further including the WD, wherein the WD is configured to communicate with the network node.

Embodiment B4. The communication system of Embodiment B3, wherein:

the processing circuitry of the host computer is configured to execute a host application, thereby providing the user data; and the WD comprises processing circuitry configured to execute a client application associated with the host application.

Embodiment C1. A method implemented in a network node, the method comprising configuring at least one set of beta offset values, for each of the at least one set of beta offset values, at least one subset of beta offset values being defined for information corresponding to Uplink Control Information (UCI) and being associated with at least one service type.

Embodiment C2. The method of Embodiment C1, wherein the at least one service type includes a first service type and a second service type, different from the first service type.

Embodiment C3. The method of Embodiment C2, wherein the first service type is an enhanced Mobile Broadband (eMBB) service and the second service type is an Ultra Reliable Low Latency Communications (URLLC) service.

Embodiment C4. The method of any of Embodiments C1 and C2, wherein the information corresponding to the UCI includes a Hybrid Automatic Repeat reQuest (HARQ) feedback.

Embodiment C5. The method of any of Embodiments C1-C4, wherein the at least one subset of beta offset values is associated with the at least one service type according to at least one transmission parameter of at least one of at least one control channel and at least one data channel.

Embodiment C6. The method of any of Embodiments C1-C5, wherein at least one transmission rule is defined for the information when data corresponding to the information is transmitted concurrently for each of the at least one service type.

Embodiment C7. The method of Embodiment C6, wherein the at least one transmission rule includes at least one of a priority transmission rule and a Channel State Information (CSI) report grouping rule.

Embodiment C8. The method of any of Embodiments C1-C7, wherein a first one of the at least one subset of beta offset values is used to transmit data corresponding to the information for a first service type of the at least one service type and a second one of the at least one subset of beta offset values is used to transmit data corresponding to the information for a second service type of the at least one service type.

Embodiment C9. The method of any of Embodiments C1-C8, wherein the information corresponding to the UCI includes a CSI feedback.

Embodiment C10. The method of Embodiment C9, wherein the at least one subset of beta offset values is associated with the at least one service type according to at least one parameter configured in a CSI report configuration.

Embodiment C11. The method of any of Embodiments C9-C10, wherein the at least one subset of beta offset values is associated with the at least one service type according to a target block error rate (BLER).

Embodiment D1. A method implemented in a communication system including a host computer, a network node and a wireless device (WD), the method comprising:

at the host computer, providing user data; and at the host computer, initiating a transmission carrying the user data to the WD via a cellular network comprising the network node, wherein the network node is configured to configure at least one set of beta offset values, for each of the at least one set of beta offset values, at least one subset of beta offset values being defined for information corresponding to Uplink Control Information (UCI) and being associated with at least one service type.

Embodiment D2. The method of Embodiment D1, further comprising, at the network node, transmitting the user data.

Embodiment D3. The method of Embodiment D2, wherein the user data is provided at the host computer by executing a host application, the method further comprising, at the WD, executing a client application associated with the host application.

Embodiment E1. A wireless device (WD) configured to communicate with a network node, the WD configured to, and/or comprising a radio interface and/or processing circuitry configured to obtain a configuration of at least one set of beta offset values, for each of the at least one set of beta offset values, the configuration associated with at least one subset of beta offset values being defined for information corresponding to Uplink Control Information (UCI) and being associated with at least one service type.

Embodiment E2. The WD of Embodiment E1, wherein the at least one service type includes a first service type and a second service type, different from the first service type.

Embodiment E3. The WD of Embodiment E1, wherein the first service type is an enhanced Mobile Broadband (eMBB) service and the second service type is an Ultra Reliable Low Latency Communications (URLLC) service.

Embodiment E4. The WD of any of Embodiments E1 and E2, wherein the information corresponding to the UCI includes a Hybrid Automatic Repeat reQuest (HARQ) feedback.

Embodiment E5. The WD of any of Embodiments E1-E4, wherein the at least one subset of beta offset values is associated with the at least one service type according to at least one transmission parameter of at least one of at least one control channel and at least one data channel.

Embodiment E6. The WD of any of Embodiments E1-E5, wherein the WD is further configured to transmit data corresponding to the information according to at least one transmission rule, the at least one transmission rule being defined for the information when the data corresponding to the information is to be transmitted concurrently for each of the at least one service type.

Embodiment E7. The WD of Embodiment E6, wherein the at least one transmission rule includes at least one of a priority transmission rule and a Channel State Information (CSI) report grouping rule.

Embodiment E8. The WD of any of Embodiments E1-E7, wherein a first one of the at least one subset of beta offset values is used to transmit data corresponding to the information for a first service type of the at least one service type and a second one of the at least one subset of beta offset values is used to transmit data corresponding to the information for a second service type of the at least one service type.

Embodiment E9. The WD of any of Embodiments E1-E8, wherein the information corresponding to the UCI includes a CSI feedback.

Embodiment E10. The WD of Embodiment E9, wherein the at least one subset of beta offset values is associated with the at least one service type according to at least one parameter configured in a CSI report configuration.

Embodiment E11. The WD of any of Embodiments E9-E10, wherein the at least one subset of beta offset values is associated with the at least one service type according to a target block error rate (BLER).

Embodiment F1. A communication system including a host computer, the host computer comprising:

processing circuitry configured to provide user data; and a communication interface configured to forward user data to a cellular network for transmission to a wireless device (WD), the WD configured to, and/or comprising a radio interface and/or processing circuitry configured to obtain a configuration of at least one set of beta offset values, for each of the at least one set of beta offset values, the configuration associated with at least one subset of beta offset values being defined for information corresponding to Uplink Control Information (UCI) and being associated with at least one service type.

Embodiment F2. The communication system of Embodiment F1, further including the WD.

Embodiment F3. The communication system of Embodiment F2, wherein the cellular network further includes a network node configured to communicate with the WD.

Embodiment F4. The communication system of Embodiment F2 or F3, wherein:

the processing circuitry of the host computer is configured to execute a host application, thereby providing the user data; and the WD's processing circuitry is configured to execute a client application associated with the host application.

Embodiment G1. A method implemented in a wireless device (WD), the method comprising obtaining a configuration of at least one set of beta offset values, for each of the at least one set of beta offset values, the configuration associated with at least one subset of beta offset values being defined for information corresponding to Uplink Control Information (UCI) and being associated with at least one service type.

Embodiment G2. The method of Embodiment G1, wherein the at least one service type includes a first service type and a second service type, different from the first service type.

Embodiment G3. The method of Embodiment G1, wherein the first service type is an enhanced Mobile Broadband (eMBB) service and the second service type is an Ultra Reliable Low Latency Communications (URLLC) service.

Embodiment G4. The method of any of Embodiments G1 and G2, wherein the information corresponding to the UCI includes a Hybrid Automatic Repeat reQuest (HARQ) feedback.

Embodiment G5. The method of any of Embodiments G1-G4, wherein the at least one subset of beta offset values is associated with the at least one service type according to at least one transmission parameter of at least one of at least one control channel and at least one data channel.

Embodiment G6. The method of any of Embodiments G1-G5, wherein the WD is further configured to transmit data corresponding to the information according to at least one of transmission rule, the at least one transmission rule being defined for the information when the data corresponding to the information is to be transmitted concurrently for each of the at least one service type.

Embodiment G7. The method of Embodiment G6, wherein the at least one transmission rule includes at least one of a priority transmission rule and a Channel State Information (CSI) report grouping rule.

Embodiment G8. The method of any of Embodiments G1-G7, wherein a first one of the at least one subset of beta offset values is used to transmit data corresponding to the information for a first service type of the at least one service type and a second one of the at least one subset of beta offset values is used to transmit data corresponding to the information for a second service type of the at least one service type.

Embodiment G9. The method of any of Embodiments G1-G8, wherein the information corresponding to the UCI includes a CSI feedback.

Embodiment G10. The method of Embodiment G9, wherein the at least one subset of beta offset values is associated with the at least one service type according to at least one parameter configured in a CSI report configuration.

Embodiment G11. The method of any of Embodiments G9-G10, wherein the at least one subset of beta offset values is associated with the at least one service type according to a target block error rate (BLER).

Embodiment H1. A method implemented in a communication system including a host computer, a network node and a wireless device (WD), the method comprising:
at the host computer, providing user data; and
at the host computer, initiating a transmission carrying the user data to the WD via a cellular network comprising the network node, wherein the WD is configured to obtain a configuration of at least one set of beta offset values, for each of the at least one set of beta offset values, the configuration associated with at least one subset of beta offset values being defined for information corresponding to Uplink Control Information (UCI) and being associated with at least one service type.

Embodiment H2. The method of Embodiment H1, further comprising, at the WD, receiving the user data from the network node.

Embodiment I1. A network node, comprising:
a memory module configured to store an indication of at least one of at least one subset of beta offset values; and
a configuration module configured to configure at least one set of beta offset values, for each of the at least one set of beta offset values, the at least one subset of beta offset values being defined for information corresponding to Uplink Control Information (UCI) and being associated with at least one service type.

Embodiment I2. A wireless device, comprising:
a memory module configured to store an indication of at least one of at least one subset of beta offset values; and
an Uplink Control Information (UCI) transmission module configured to obtain a configuration of at least one set of beta offset values, for each of the at least one set of beta offset values, the configuration associated with at least one subset of beta offset values being defined for information corresponding to the UCI and being associated with at least one service type.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++.

However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device (WD), the network node comprising processing circuitry configured to:
    configure at least one set of beta offset values, and for each of the at least one set of beta offset values, at least one subset of beta offset values being defined for information corresponding to Uplink Control Information (UCI) and the at least one subset of beta offset values being associated with a service type,
        wherein the at least one subset of beta offset values is associated with the service type according to at least one transmission parameter of at least one of at least one control channel and at least one data channel, and
        wherein the at least one transmission parameter includes Physical Downlink Control Channel (PDCCH) aggregation level and an Uplink (UL) carrier index.

2. The network node of claim 1, wherein the service type includes a first service type and a second service type, the second service type being different from the first service type, wherein the first service type is an enhanced Mobile Broadband (eMBB) service and the second service type is an Ultra Reliable Low Latency Communications (URLLC) service.

3. The network node of claim 1, wherein the information corresponding to the UCI includes a Hybrid Automatic Repeat request (HARQ) feedback and/or a Channel State Information (CSI) feedback.

4. The network node of claim 1, wherein at least one transmission rule is defined for the information when data corresponding to the information is transmitted concurrently for each of a service type.

5. The network node of claim 4, wherein the at least one transmission rule includes at least one of a priority transmission rule and a Channel State Information (CSI) report grouping rule.

6. The network node of claim 1, wherein a first one of the at least one subset of beta offset values is used to transmit data corresponding to the information for a first service type of the service type and a second one of the at least one subset of beta offset values is used to transmit data corresponding to the information for a second service type of the service type.

7. The network node of claim 1, wherein the at least one subset of beta offset values is associated with the service type according to at least one parameter configured in a Channel State Information (CSI) report configuration.

8. The network node of claim 1, wherein the at least one subset of beta offset values is associated with the service type according to a target block error rate (BLER).

9. A method for a network node, the method comprising:
    configuring at least one set of beta offset values, and for each of the at least one set of beta offset values, at least one subset of beta offset values being defined for information corresponding to Uplink Control Information (UCI) and the at least one subset of beta offset values being associated with a service type,
        wherein the at least one subset of beta offset values is associated with the service type according to at least one transmission parameter of at least one of at least one control channel and at least one data channel, and
        wherein the at least one transmission parameter includes a Physical Downlink Control Channel (PDCCH) aggregation level and an Uplink (UL) carrier index.

10. A wireless device (WD), configured to communicate with a network node the WD comprising processing circuitry configured to:
    obtain a configuration of at least one set of beta offset values, and for each of the at least one set of beta offset values, the configuration being associated with at least one subset of beta offset values, the at least one subset of beta offset values being defined for information corresponding to Uplink Control Information (UCI) and the at least one subset of beta offset values being associated with a service type,
        wherein the at least one subset of beta offset values is associated with the service type according to at least one transmission parameter of at least one of at least one control channel and at least one data channel, and
        wherein the at least one transmission parameter includes a Physical Downlink Control Channel (PDCCH) aggregation level and an Uplink (UL) carrier index.

11. The WD of claim 10, wherein the service type includes a first service type and a second service type, the second service type being different from the first service type, wherein the first service type is an enhanced Mobile Broadband, eMBB, service and the second service type is an Ultra Reliable Low Latency Communications (URLLC) service.

12. The WD of claim 10, wherein the information corresponding to the UCI includes a Hybrid Automatic Repeat request (HARQ) feedback, and/or wherein the information corresponding to the UCI includes a Channel State Information (CSI) feedback.

13. The WD of claim 10, wherein the WD is further configured to transmit data corresponding to the information according to at least one transmission rule, the at least one transmission rule being defined for the information when the data corresponding to the information is to be transmitted concurrently for each of a service type.

14. The WD of claim 13, wherein the at least one transmission rule includes at least one of a priority transmission rule and a Channel State Information (CSI) report grouping rule.

15. The WD of claim 10, wherein a first one of the at least one subset of beta offset values is used to transmit data corresponding to the information for a first service type of the service type and a second one of the at least one subset of beta offset values is used to transmit data corresponding to the information for a second service type of the service type.

16. The WD of claim 10, wherein the at least one subset of beta offset values is associated with the service type according to at least one parameter configured in a Channel State Information (CSI) report configuration.

17. The WD of claim 10, wherein the at least one subset of beta offset values is associated with the service type according to a target block error rate (BLER).

18. A method for a wireless device (WD), the method comprising:
obtaining a configuration of at least one set of beta offset values, and for each of the at least one set of beta offset values, the configuration being associated with at least one subset of beta offset values, the at least one subset of beta offset values being defined for information corresponding to Uplink Control Information (UCI) and the at least one subset of beta offset values being associated with a service type,
wherein the at least one subset of beta offset values is associated with the service type according to at least one transmission parameter of at least one of at least one control channel and at least one data channel, and
wherein the at least one transmission parameter includes a Physical Downlink Control Channel (PDCCH) aggregation level and an Uplink (UL) carrier index.

* * * * *